2,911,281
Patented Nov. 3, 1959

2,911,281

PROCESS OF PREPARING THIOPHOSPHORYL CHLORIDE

Harold L. Dimond and Marvin O. Shrader, Pittsburgh, Pa., assignors to Pittsburgh Coke & Chemical Company, Pittsburgh, Pa., a corporation of Pennsylvania No Drawing. Application September 18, 1956
Serial No. 610,684

13 Claims. (Cl. 23—14)

This invention relates to a process of preparing thiophosphoryl chloride ($PSCl_3$).

Numerous methods have previously been proposed for forming thiophosphoryl chloride. Thus, in Cook Patent 2,591,782, it is proposed to react phosphorus trichloride with sulfur in the presence of an aluminum halide as a catalyst to form this compound. However, aluminum halides are relatively expensive. Moreover, the maximum yield obtained in the examples of Cook is only 82.5%, and the reaction is difficult to control, especially on a plant scale.

It has also been proposed to react phosphorus trichloride, sulfur and sulfur monochloride ($S_2Cl_2$) to form thiophosphoryl chloride, e.g., see Jonas Patent 2,575,317. This reaction suffers from the disadvantage that the yields obtained are relatively poor. Additionally, this process requires the use of large amounts of sulfuryl monochloride.

It is an object of the present invention to obtain thiophosphoryl chloride in improved yields.

Another object is to prepare thiophosphoryl chloride with the aid of a novel catalyst mixture.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be obtained by reacting phosphorus trichloride with sulfur in the presence of a catalyst comprising a mixture of a ferric halide and sulfur monochloride. While ferric bromide can be employed, the preferred ferric halide is ferric chloride. The catalyst mixture of ferric chloride and sulfur monochloride results in yields as high as 100% of thiophosphoryl chloride. This is surprising in view of the fact that sulfur monochloride is a very poor catalyst for the reaction and ferric chloride by itself will not even take the reaction to completion.

The ferric chloride and sulfur monochloride are normally used in a 1 to 1 ratio by weight although the ratio can be from 10 to 1 ferric chloride to sulfur monochloride by weight or above to 10 to 1 sulfur monochloride to ferric chloride by weight or above. The minimum amount of sulfur monochloride is 0.1% and of the ferric chloride 1.1% in the thiophosphoryl chloride-sulfur mixture.

The reaction does not proceed satisfactorily when sulfur monochloride is used as the sole catalyst. Ferric chloride can be used as the sole catalyst if it is employed in an amount of at least 5%, although the results are not as satisfactory as when the mixture of catalysts is employed. As long as the minimum amounts of sulfur monochloride and ferric chloride are employed, the ratio of these two materials to each other is not critical.

The phosphorus trichloride and sulfur reactants can be used in a 1 to 1 mol ratio. Preferably, however, a slight excess of sulfur is used, e.g., up to 15% (mol percent) to assure optimum yields. The ferric chloride is normally employed in an amount of 1.1 to 5% based on the total of the sulfur and phosphorus trichloride by weight. Similarly, the sulfur monochloride is normally used in an amount of 0.1 to 5% based on the total of the sulfur and phosphorus trichloride by weight. No advantage is obtained by using over 1.1% of ferric chloride (or other ferric halide) or over 1% sulfur monochloride and the excess is merely wasteful. Preferably, about 1% by weight of each of the ferric chloride and sulfur monochloride are employed based on the total of the sulfur and phosphorus trichloride. The use of 0.1% of sulfur monochloride with 1.1% of ferric chloride results in a slight increase in reaction time over the optimum conditions.

While it is possible to carry out the reaction merely by adding, for example, a mixture of phosphorus trichloride and sulfur monochloride to a mixture of sulfur and ferric chloride, it has been found advantageous to carry out the reaction in the presence of a heel of thiophosphoryl chloride or other high boiling material. The reason for this is that without such a heel, the temperature of the reaction is limited to an upper limit of about 75° C., the boiling point of phosphorus trichloride. It has been found, however, that the reaction proceeds best at temperatures of 120° C. and above. The use of a heel of thiophosphoryl chloride is preferred as it introduces no problems in the separation of the product. When the reaction is carried out batchwise, a portion of the thiophosphoryl chloride can be left in the reaction vessel from a previous batch to serve as the heel. The amount of the high boiling material heel is not critical, but, as mentioned above, should be enough to raise the boiling or reflux point of the mixture to at least 120° C.

In place of thiophosphoryl chloride, the heel can be made of an inert high boiling solvent, e.g., trichlorobenzene (the commercial mixture being mainly the 1,2,4 isomer). The upper limit on the temperature is not critical and is usually the boiling point of the solvent.

The phosphorus chloride-sulfur reaction is normally difficult to control. The present modification of that process has built-in controls, e.g., the use of a heel. The reaction is desirably additionally controlled by adding the phosphorus trichloride to the sulfur in the reaction vessel, although the two reactants can be added simultaneously. The ferric chloride and sulfur monochloride can be added together or with either reactant. It has been found desirable to raise the temperature in the reaction vessel to reflux before all of the reagents are added. The reason for this is that very poor yields are obtained if all the reagents are present in the reaction vessel before the mixture is raised to the reflux temperature. Additionally, the temperature could not be raised to 125–127° C. The reaction can be carried out at atmospheric, subatmospheric or superatmospheric pressure. In the latter case, the boiling point of the material used in the heel will be raised.

Instead of employing a batch process, the reaction can be carried out in continuous fashion by constantly draining off a portion of the heel. In this case, both reactants and both catalysts should be continuously added to the reaction chamber.

It has been found that when employing a batch process if 1% of ferric chloride and 1% of sulfur monochloride are employed in the original batch, and a heel is left in the reaction vessel, that no new ferric chloride need be added for the preparation of subsequent batches and only traces of sulfur monochloride need be added with the phosphorus trichloride to revitalize the ferric chloride. Thus, the percent of ferric chloride used as a catalyst can be reduced to an average net amount of 0.2% or less by weight of the reactants, and the average net amount of sulfur monochloride can similarly be so reduced.

The process of the present invention is essentially a one-step operation prior to removal of the product and requires no induction period, no external cooling and is completely safe for large scale operation. The method of Cook, on the other hand, requires several stages. Thus, in the Cook procedure, the temperature is raised to 45° C., for example, before the catalyst is added. Then catalyst is added; an induction period is then experienced before reaction occurs. Next, external cooling must be applied, since the reaction is violent.

Throughout the present specification and claims all parts and percentages are by weight unless otherwise specified.

Example 1

Into a 3-necked, ground-glass, 500 cc. flask equipped with a reflux condenser, stirrer and a dropping, graduated funnel were added 160.5 grams (100 cc.) of commercial $PSCl_3$ together with 2 grams of anhydrous $FeCl_3$ and 38 grams of sulfur. This mixture was stirred together and heated to reflux temperature (125–127° C.) and a mixture of 140 grams (90 cc.) of $PCl_3$ containing 1.7 grams (1 cc.) of $S_2Cl_2$ were added dropwise over a period of 4½ hours. The temperature remained at 125° C. or slightly above throughout the run. After all of the $PCl_3$ was added, the mixture was refluxed for one hour more. The product was then distilled out at a vapor temperature of 122–123° C. Only 100 cc. was collected, while the remainder was left as a heel for use in the next run. In succeeding runs no additional ferric chloride was required and only 33 grams of sulfur was needed in each succeeding run rather than the 38 grams employed in the first run. The amount of phosphorus trichloride added was 140 grams in each of the succeeding runs, and it contained traces of the sulfur monochloride to revitalize the ferric chloride.

Example 2

Example 1 was repeated but the time of the dropwise addition of the $PCl_3$ containing $S_2Cl_2$ was only 3 hours. The results obtained were the same as those in Example 1. The yield of thiophosphoryl chloride was substantially 100%.

Example 3

Example 2 was repeated but the time of the dropwise addition of the $PCl_3$ containing $S_2Cl_2$ was increased by 3 hours (a total of 6 hours addition time). The same results were obtained as in Example 1.

Example 4

In all, six additional runs were made like Example 1, but without adding more ferric chloride. Only the original heel of 100 cc. of $PSCl_3$ was required for all six of these runs and the yields of thiophosphoryl chloride obtained by distillation in each run was substantially 100%.

Example 5

38 grams of powdered sulfur (a 15% excess over and above the 33 grams required for 1.03 mols) was placed in a 500 ml., 3-necked, ground-glass flask fitted with a thermometer, ground-glass stirrer, and a reflux condenser capable of use as a distillation condenser. To this was added 2 grams of anhydrous $FeCl_3$ (1.15% by weight of the reactants). The temperature was raised to 127° C. This temperature was maintained during the addition of a mixture of 0.1 ml. (0.17 gram or 0.1%) $S_2Cl_2$ in 140 grams (90 ml. or 1.02 mols) of phosphorous trichloride over a period of 6 hours. After a short period of digestion (0.5 to 1.0 hour) at reflux the condenser was tipped into position for distillation. 160.5 grams (100 ml.) of usable thiophosphoryl chloride was distilled out at 122–123° C.

We claim:

1. A process of preparing thiophosphoryl chloride which comprises reacting phosphorus trichloride with sulfur in the presence of a mixture of a ferric halide and sulfur monochloride, the ferric halide being present in an amount effective to increase the yield of thiophosphoryl chloride over that obtained by utilizing the sulfur monochloride alone.

2. A process according to claim 1 wherein the ferric halide is ferric chloride.

3. A process according to claim 2 wherein the ratio of ferric chloride to sulfur monochloride is from 10 to 1 to 1 to 10 by weight.

4. A process according to claim 3 wherein the ferric chloride is from 1.0 to 5% of the weight of the reactants and the sulfur monochloride is from 0.1 to 5% of the weight of the reactants.

5. A process of preparing thiophosphoryl chloride which comprises reacting phosphorus trichloride with sulfur at an elevated temperature in the presence of a mixture of ferric chloride and sulfur monochloride as cocatalysts, the ferric halide being present in an amount effective to increase the yield of thiophosphoryl chloride over that obtained by utilizing the sulfur monochloride alone, and in the presence of a high boiling inert material as a heel to insure a reaction temperature above the boiling point of phosphorus trichloride.

6. A process according to claim 5 wherein the heel is thiophosphoryl chloride.

7. A process according to claim 6 wherein the ratio of ferric chloride to sulfur monochloride employed is from 10 to 1 to 1 to 10 by weight.

8. A process according to claim 6 wherein the thiophosphoryl chloride formed is removed by distillation but the distillation is stopped prior to removal of a substantial portion of the heel, further sulfur, phosphorus trichloride and a trace of sulfur monochloride are added to the heel but no additional ferric chloride is added and the heat reaction is repeated to form further amounts of thiophosphoryl chloride.

9. A process according to claim 5 wherein the thiophosphoryl chloride formed is removed by distillation leaving the heel as a residue, additional sulfur, phosphorus trichloride and a trace of sulfur monochloride are added to the heel but no additional ferric chloride is added and the heat reaction is repeated to form further amounts of thiophosphoryl chloride.

10. A process according to claim 1 wherein the sulfur monochloride is used in an amount of about 0.1% and the ferric chloride in an amount of about 1% of the weight of the reactants.

11. A process according to claim 1 wherein the sulfur monochloride is used in an amount of at least about 0.1% and the ferric chloride in an amount of at least about 1% of the weight of the reactants.

12. A process according to claim 11 wherein at least one of the reagents is added after the mixture has been heated to reflux temperature.

13. A process according to claim 12 wherein the reaction is carried out in the presence of an excess of thiophosphoryl chloride as a heel and the reaction is carried out under reflux.

(References on following page)

References Cited in the file of this patent

UNITED STATES PATENTS

| | | |
|---|---|---|
| 1,811,602 | Woodstock et al. | June 23, 1931 |
| 2,547,012 | Johnson | Apr. 3, 1951 |
| 2,547,158 | Godfrey | Apr. 3, 1951 |
| 2,575,317 | Jonas et al. | Nov. 13, 1951 |
| 2,802,717 | Edwards et al. | Aug. 13, 1957 |
| 2,850,353 | Korkmas | Sept. 2, 1958 |

OTHER REFERENCES

Mellor: "Comprehensive Treatise on Inorganic and Theoretical Chemistry," vol. 8, page 1012, Longmans, Green and Co., New York, N.Y., 1928; vol. 10, p. 634.